INVENTOR.
DONALD C. BRUNTON
BY
*Munson H. Lane*
ATTORNEY

United States Patent Office 3,405,268
Patented Oct. 8, 1968

3,405,268
RADIANT ENERGY ABSORPTION GAGE FOR MEASURING THE WEIGHT OF A BASE MATERIAL AND THE CONTENT OF A MATERIAL SORBED BY THE BASE MATERIAL
Donald C. Brunton, Columbus, Ohio, assignor to Brun Sensor Systems, Inc., a corporation of Ohio
Filed Mar. 12, 1965, Ser. No. 439,301
16 Claims. (Cl. 250—83.3)

ABSTRACT OF THE DISCLOSURE

An apparatus for measuring the basis weight and moisture content of a paper web comprising a source of radiant energy emitting radiant energy consisting of at least the infrared spectral band, an optical device for deriving at least three separate beams of substantial monochromatic radiation within the infra-red spectral band from the radiant energy source and directing each beam through a paper web, each beam being of a specific wave length such that a first beam $\lambda_1$ is of a wave length that is subject to molecular bond absorption by the water molecules within the paper web but is independent of molecular bond absorption by the cellulose molecules in the paper web, a second beam $\lambda_2$ is of a wave length that is independent of a molecular bond absorption by the cellulose molecules and the water molecules, and a third beam $\lambda_3$ is of a wave length that is subject to molecular bond absorption by the cellulose molecules but is independent of molecular bond absorption by the water molecules, a detector system including a detector located on the opposite side of said paper web from said radiant energy source for intercepting the radiant energy of each of the beams $\lambda_1$, $\lambda_2$, and $\lambda_3$, which are transmitted through said web and for producing separate electrical voltage signals which are proportional to the intensity of the radiant energy of each of said beams intercepted by the detector, a first ratio calculating device for producing a voltage signal $V_m$ proportional to the ratio of the signal produced from $\lambda_1$ to the signal produced from $\lambda_2$, and said voltage $V_m$ being proportional to the moisture present in the web, from $\lambda_1$ to the signal produced from $\lambda_2$ said voltage signal $V_w$ proportional to the ratio of the signal produced from $\lambda_3$ to the signal produced from $\lambda_2$, the voltage $V_w$ being proportional to the cellulose content of the paper web and thus to the basis weight, and an indicator for indicating moisture content and basis weight in response to $V_m$ and $V_w$ respectively.

---

This invention relates to a method and apparatus for the measurement of the weight of a base material and the amount of a substance in the base material through the use of infra-red absorption phenomena. An illustrative embodiment of this invention will be described relating to the continuous measurement of the basis weight of a traveling paper web and concurrent measurement of the quantity of moisture in the paper web.

Prior apparatus has been devised for the measurement of the basis weight of paper by passing a beam of radiant energy of a selected wave length through a paper web so that the beam is modulated by molecular bond absorption of the cellulose molecules in the paper sheet but is not subject to water molecule absorption. The modulated radiant energy beam is detected by suitable radiation responsive means which produces a fluctuating voltage responsive to the modulation of the emergent beam by the paper sheet and suitable means is provided which interprets the fluctuation voltage in terms of the basis weight of the paper.

Also, prior apparatus has been devised for measuring the moisture content of a paper sheet utilizing a dual channel system, wherein a signal is produced in one channel which is dependent on the basis weight of the sheet through molecular bond absorption of a radiant energy beam by cellulose molecules in the sheet and a signal is produced in another channel which is dependent on both basis weight of the sheet and moisture content thereof through molecular bond absorption of a second radiant energy beam by both cellulose molecules and water molecules in the sheet. The two signals from both channels are combined to yield a resulting signal that is dependent solely on the moisture content of the paper sheet. This result obviously depends on the second channel being dependent on sheet weight to the same degree and hence in the same manner as the first channel, i.e., by molecular bond absorption of the cellulose molecules. Only under this condition can the signals be combined in such a way as to eliminate a dependence on sheet basis weight for all values of the basis weight.

The prior art apparatus hereinbefore described has been disclosed in patent application Ser. No. 363,047 (now Patent No. 3,228,282, patented Jan. 11, 1966), filed Apr. 17, 1964 by William E. Barker, Jr., which application is owned by the same assignee as the present application.

The dual channel system for measurement of moisture content as heretofore described requires that a wave length be found for which the radiation is simultaneously absorbed by molecular bond absorption of the cellulose molecule and by molecular bond absorption of the water molecule, and a second wave length be found for which the radiation is absorbed by cellulose molecule molecular bond absorption to the same degree as the first wave length but is not absorbed by molecular bond absorption due to the water molecules. These requirements place a severe restriction on the choice of wave length in order to obtain the advantage of a moisture measurement from, say, the ratio of the signals from the two channels. It does not permit the measurement of basis weight by a simple ratio method since by definition the two channels have the same response to basis weight.

It is an object of the present invention to provide a multi channel system in which to obtain the advantage of measurement of both weight and moisture by a ratio of channel outputs and hence a method that is independent of the source intensity or of any other characteristic of the measurement which affects all the wave lengths employed in a similar manner.

It is a further object of the invention to provide an apparatus for measuring the basis weight and moisture content of a paper web comprising a source of radiant energy emitting radiant energy consisting of at least the infra-red spectral band, optical means for deriving at least three separate beams of substantial monochromatic radiation within the infra-red spectral band from the radiant energy source and directing each beam through a paper web, each beam being of a specific wave length such that a first beam $\lambda_1$ is of a wave length that is subject to molecular bond absorption by the water molecules within the paper web but is independent of molecular bond absorption by the cellulose molecules in the paper web, a second beam $\lambda_2$ is of a wave length that is independent of molecular bond absorption by the cellulose molecules and the water molecules, and a third beam $\lambda_3$ is of a wave length that is subject to molecular bond absorption by the cellulose molecules but is independent of molecular bond absorption by the water molecules, detector means located on the opposite side of said paper web from said radiant energy source for intercepting the radiant energy of each of the beams $\lambda_1$, $\lambda_2$ and $\lambda_3$, which are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_2$, said voltage $V_m$ being proportional to the moisture present in the web, a second ratio calculating means for producing a voltage signal $V_w$ proportional to the ratio of the signal produced from $\lambda_3$ to the signal produced from $\lambda_2$, said voltage $V_w$ being proportional to the cellulose content of the paper web and thus to the basis weight and separate recorder means for indicating moisture content and basis weight in response to $V_m$ and $V_w$, respectively.

Other features and advantages of the invention will become apparent from the following description taken in conjunction with the drawings in which.

Figure 1:
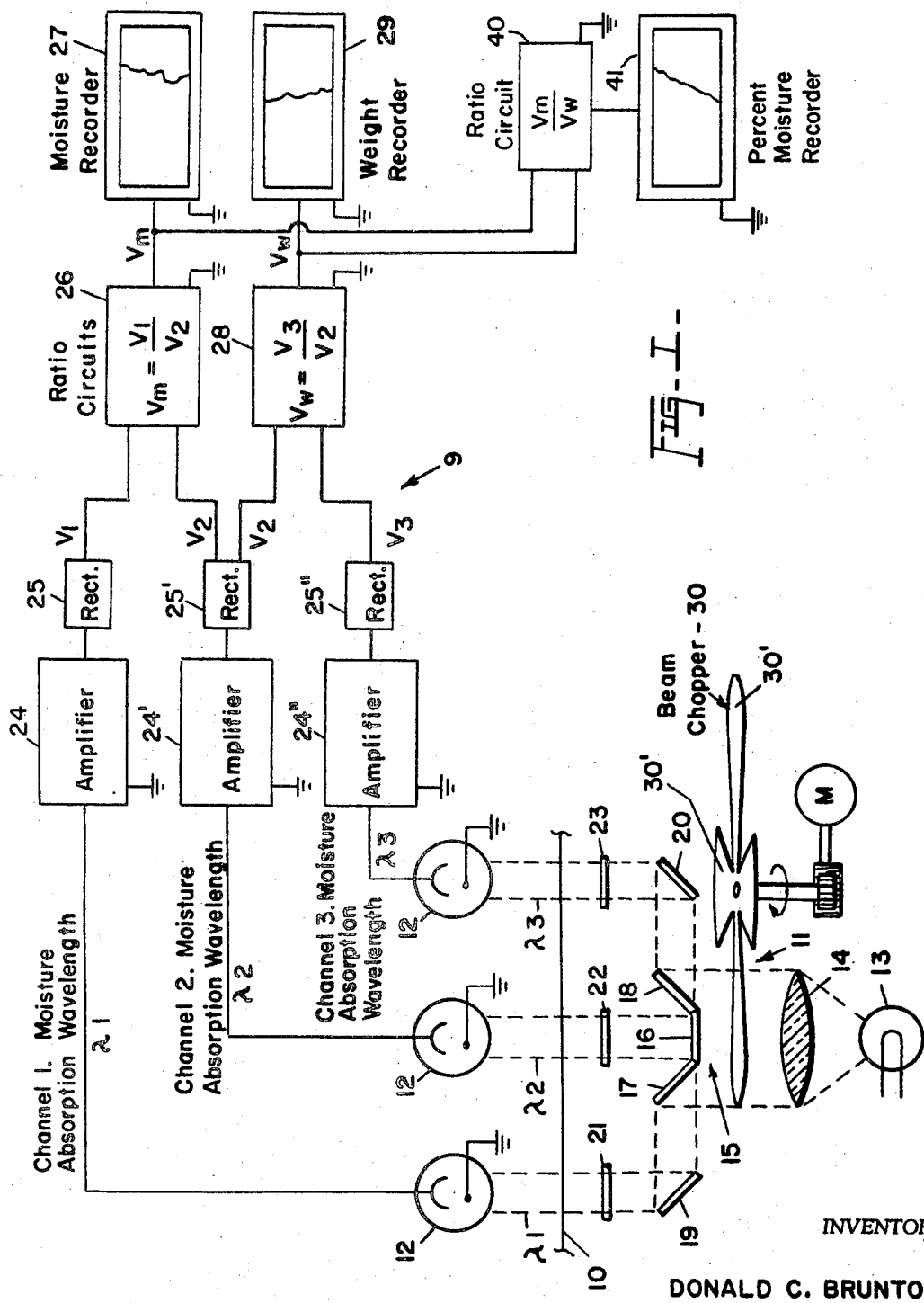
FIG. 1 is a schematic diagram of an infra-red resonant absorption gage for concurrently measuring the basis weight and moisture content of a paper web.

Referring first to FIG. 1, a traveling web 10 of wet paper such as from a paper making machine intercepts three separate beams of radiant energy having distinct wave lengths $\lambda_1$, $\lambda_2$, and $\lambda_3$, respectively. A suitable means 11 for producing the three beams of radiant energy is positioned on one side of the web, and suitable radiant energy detectors for detecting each beam of radiant energy are positioned on the other side of the web so as to detect the radiant energy transmitted through the web.

The radiant energy beam producing means as illustrated includes a radiation source 13, a collimating lens 14, a chopper 30 and a beam splitter 15 which separates the radiant energy beam from collimator 14 into three separate beams. The chopper 30, driven by motor M, is provided with opaque blade portions 30' which interrupt the light beam from the radiant energy source 13 at a preselected frequency $f$ at a point before the light beam is split by the beam splitter 15. The beam splitter 15 may take various forms but is illustrated here as comprising a central transmitting window portion 16, and inclined mirror portions 17 and 18. The window portion 16 transmits radiant energy directed therein, while mirror portions 17 and 18 reflect the intercepted radiant energy beam portions at 45° angles toward mirrors 19 and 20, respectively, which redirect the radiant energy beam portions in a direction normal to the traveling web 10. The radiant energy source may be an incandescent lamp having a continuous spectral output that includes the infra-red band, the lamp being supplied from a well regulated power supply to provide substantially constant light temperature and hence emission spectrum. The three beams of radiant energy directed toward the web 10 pass through filters 21, 22, 23, respectively, which convert the beams into three substantially monochromatic radiations having wave lengths $\lambda_1$, $\lambda_2$ and $\lambda_3$ within the infra-red radiation spectrum.

$\lambda_1$ must be of a wave length such that it is subject to molecular bond absorption of the water molecule but not subject to molecular bond absorption of the cellulose molecule. Such a wave length may be found in the region of from 1 to 2 microns and in the region of from 2.5 to 3 microns.

$\lambda_2$ must be of a wave length such that it is not subject to molecular bond absorption of the cellulose molecule and the water molecule. Such wave length may be found in the region of from 1.6 to 1.8 microns, 2 to 2.5 microns and 3.7 to 3.9 microns.

$\lambda_3$ must be of a wave length such that it is subject to molecular bond absorption of the cellulose molecule, but is not subject to molecular bond absorption of the water molecule. Such a wave length may be found in the region of from 3 to 4 microns.

The three beams $\lambda_1$, $\lambda_2$, and $\lambda_3$ after passing through the traveling web 10 are each separately detected by one of the detectors 12, 12', 12" which are connected respectively in channels 1, 2 and 3 of the gage 9. The radiation detectors 12, 12', 12" are photosensitive devices such as lead selenide photocells, which produce voltage outputs that vary in accordance with the intensity of the radiation falling on the photocell. Channel 1 is designated as a moisture absorption channel which detects $\lambda_1$ after it has passed through the web 10 wherein a portion of the beam has been absorbed by the molecular bond absorption resulting from the water molecule in the web. Channel 2 is designated as a non-absorption channel which detects $\lambda_2$ after it has passed through the web 10 without molecular bond absorption by the cellulose and water molecules. Channel 3 is designated as a cellulose absorption channel which detects $\lambda_3$ after it has passed through the web 10 wherein a portion of the beam has been absorbed by the cellulose molecules in the web. The voltage signal produced by the detector 12 in channel 1 therefore is dependent upon molecular bond absorption resulting from moisture content in the paper web 10 but is independent of molecular bond absorption resulting from the cellulose molecule of the paper. The voltage signal produced by the detector 12' in channel 2 is independent of molecular bond absorption resulting from the cellulose molecules and the water molecules, but it varies with any change of intensity of the radiant energy source 13. The voltage signal produced by the detector 12" in channel 3 is dependent upon molecular bond absorption resulting from the cellulose molecules in the paper web but is independent of molecular bond absorption resulting from the water molecules in the paper web. The signals detected by the detectors 12, 12' and 12" are each amplified in their respective channels by suitable amplifiers 24, 24' and 24". The amplifiers are tuned to the frequency of interruption of the radiant energy beam caused by the chopper 30. Each amplifier may consist of one or more stages as needed to provide an output signal of sufficient amplitude to be used in the subsequent stages of the measuring gage. While a specific amplifier has not been shown in the drawings, amplifiers having the characteristics herein set forth are well known to persons skilled in the art. By way of example, the channel amplifiers may be similar in general construction to the amplifiers 28, 28' described in the application S.N. 363,047 previously referred to with the exception that component values are selected in the case of the invention to correspond to the frequencies used herein.

The output signals from amplifiers 24, 24' and 24" are rectified in suitable rectifiers 25, 25' and 25", respectively, to produce a D.C. voltage output that is approximately equal to an average to RMS amplitude as compared to the peak amplitude excursion of the signals. One illustrative form of rectifier that may be used is designated by reference numeral 44 as described in the application S.N. 363,047 of William E. Barker, Jr., previously referred to, or the rectifiers may be linear rectifying devices such as the model 900 AC-DC converters manufactured by United Systems Corporation of Dayton, Ohio.

The voltage output $V_1$ from rectifier 25 in channel 1 and the voltage output $V_2$ from rectifier 25' in channel 2 are fed into the input side of a ratio circuit 26 which produces an output voltage $V_1/V_2$. The voltage ratio $V_1/V_2$ is proportional to the radiant energy absorbed in the paper web 10 as a result of molecular bond absorption by the water molecules in the web, and is therefore proportional to the moisture present in the web. It is independent of other factors such as sheet weight, source intensity and sheet position in the source beam. The ratio circuit 26 is one selected from several electrical ratio circuits known in the art, one example of which is disclosed in U.S. Patent No. 2,244,369, issued June 3, 1941 to Louis Martin. The output voltage $V_m$ from the ratio circuit 26 is applied to a moisture recorder 27 which is calibrated to give a moisture content indication which is directly proportional to the voltage signal $V_m$.

Similarly, the voltage output $V_3$ from rectifier 25″ in channel 3 and the voltage output $V_2$ from rectifier 25′ in channel 2 are fed into the input side of a ratio circuit 28 which produces a voltage output $V_3/V_2$. The voltage ratio $V_3/V_2$ is proportional to the radiant energy absorbed in the paper web 10 as a result of molecular bond absorption by the cellulose molecules in the paper web. It is independent of other factors such as sheet moisture, source intensity and sheet position in the source beam. The ratio circuit 28 is similar to the ratio circuit 26. The output voltage $V_w$ is applied to a basic weight recorder 29 which is calibrated to give a visual basis weight indication which is directly proportional to the voltage signal $V_w$. The basis weight indication is not subject to error resulting from moisture content in the paper.

Figure 2:
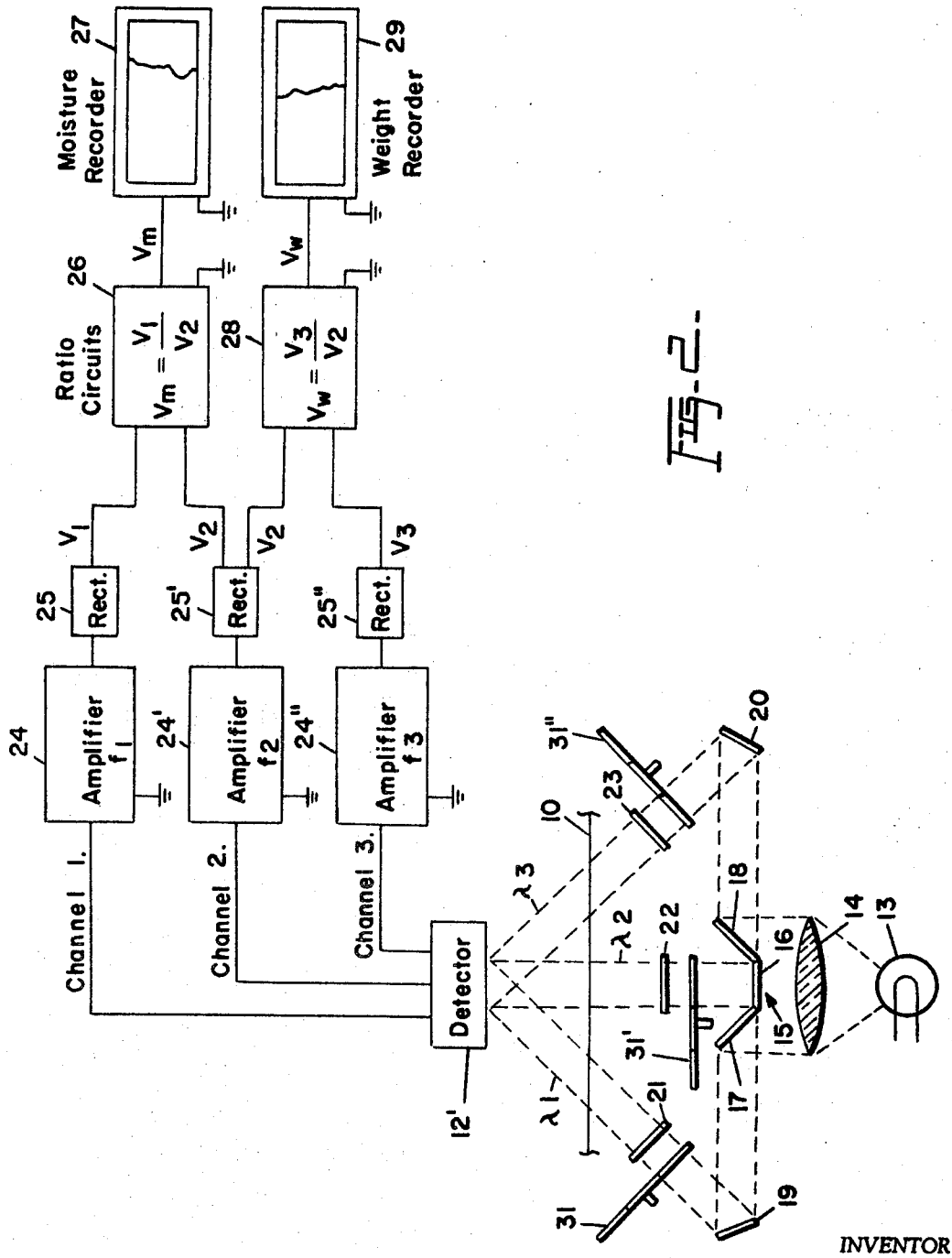
FIG. 2 is a schematic diagram of a modified preferred form of the invention.

FIG. 2 illustrates another preferred form of the invention. In this form the optical system is the same as in FIG. 1, except that the mirrors 19 and 20 are positioned to reflect the beams $\lambda_1$, and $\lambda_3$, respectively through the web 10 onto a single detector 12′. Instead of using a single chopper as in FIG. 1, three choppers 31, 31′, and 31″ are provided which are positioned to interrupt the beams $\lambda_1$, $\lambda_2$, and $\lambda_3$, respectively at different frequencies $f_1$, $f_2$, and $f_3$. The beams $\lambda_1$, $\lambda_2$ and $\lambda_3$ each are detected by the single detector 12′. The use of a single detector is preferred since the problem of detector stability encountered when multiple detectors are used is eliminated. The detector 12′ has three outputs going to three tuned amplifiers 24, 24′ and 24″ tuned to the frequencies $f_1$, $f_2$ and $f_3$, respectively. The amplifiers 24, 24′, and 24″, correspond to the same amplifiers in FIG. 1, but instead of all the amplifiers being tuned to the same frequency, they are tuned to separate frequencies. The remainder of the gage is identical with the gage described with respect to FIG. 1, the output leads from amplifiers 24, 24′, and 24″ being connected as in FIG. 1 to rectifiers 25, 25′, and 25″, respectively. Amplifier 24, tuned to the frequency $f_1$ isolates and amplifies the signal from detector 12′ produced in response to radiant energy beam $\lambda_1$. Amplifier 24′, tuned to the frequency $f_2$ isolates and amplifies the signal from detector 12′ produced in response to radiant energy beam $\lambda_2$. Amplifier 24″, tuned to frequency $f_3$ isolates and amplifies the signal from detector 12′ produced in response to radiant energy beam $\lambda_3$. The outputs $V_1$, $V_2$ and $V_3$ from the amplifiers 24, 24′ and 24″ are treated in the same manner as described with reference to FIG. 1 and consequently, there is no need to further describe the treatment of these outputs.

Figure 3:
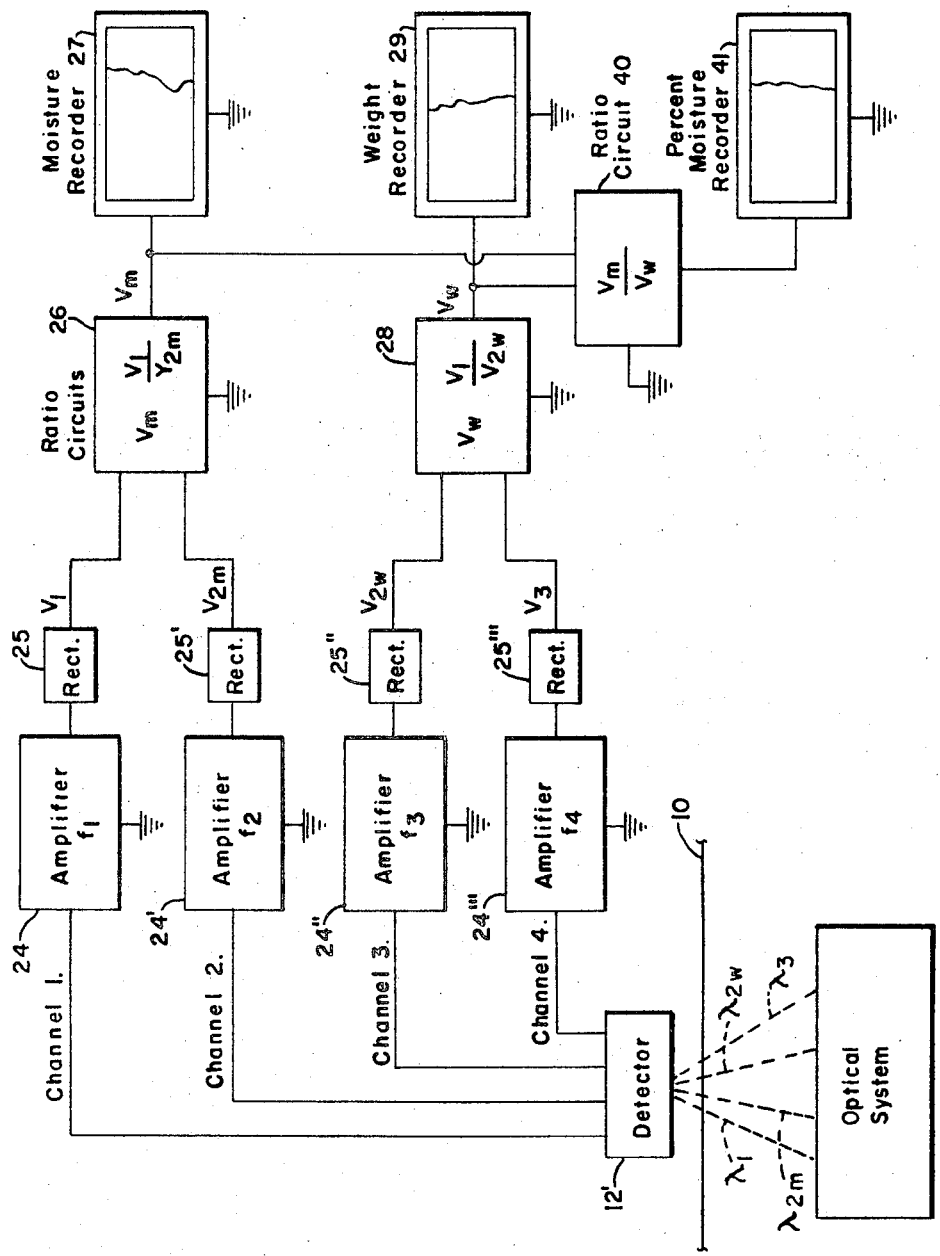
FIG. 3 is a schematic diagram of another modified form of the invention.

It is further within the scope of this invention, as shown in FIG. 3 of the drawings, that instead of the beam $\lambda_2$, two beams $\lambda_{2m}$ and $\lambda_{2w}$ each having the characteristics described for $\lambda_2$ but occurring in different portions of the infra-red spectrum can be derived from the radiant energy source 13 by suitable beam splitting and optical means 53, $\lambda_{2m}$ may preferably be chosen in a region of the spectrum close to $\lambda_1$ and $\lambda_{2w}$ may be chosen in a region close to $\lambda_3$. The beams $\lambda_1$, $\lambda_{2m}$, $\lambda_{2w}$, and $\lambda_3$ may each be interrupted by choppers at a selected frequency in the manner as described in reference to FIG. 2. The pulsating beams can then be directed through the web 10 onto a single detector 12′ in the same manner shown in reference to FIG. 2. However, instead of the detector having three outputs, it would have four outputs going to four amplifiers each tuned to the frequencies of the pulsating beams $\lambda_1$, $\lambda_{2m}$, $\lambda_{2w}$ and $\lambda_3$, respectively. A first pair of amplifiers 24, 24′ would isolate and amplify signals from the detector which are produced in response to the beams $\lambda_1$ and $\lambda_{2m}$, respectively. The outputs from the first pair of amplifiers would be rectified by separate rectifiers 24, 25′. The outputs, designated $V_1$ and $V_{2m}$, from the first pair of rectifiers would be fed as separate inputs into a ratio circuit 26, where the ratio $V_1/V_{2m}$ is taken. The resulting signal $V_m$ is applied to a moisture recorder 27 as in FIG. 1. A second pair of amplifiers 24″, 24‴ would isolate and amplify the signals from the detector 12′ which are produced in response to the beams $\lambda_{2w}$ and $\lambda_3$, respectively. The outputs from the second pair of amplifiers would be fed to rectifiers 25″, 25‴ which would produce voltage signals $V_{2w}$ and $V_3$. These signals would be fed to a ratio circuit 28 where the ratio $V_3/V_{2w}$ is taken. The resulting signal $V_w$ is applied to a basis weight recorder as 29 in FIG. 1.

It is further within the scope of this invention to use instead of a single detector as described with reference to the last mentioned modification a pair of detectors where the first detector detects the modulated beams $\lambda_1$ and $\lambda_{2m}$ and the second detector detects the modulated beams $\lambda_{2w}$ and $\lambda_3$. The signals resulting from $\lambda_1$ and $\lambda_{2m}$ would be isolated, amplified, rectified, and applied to a ratio circuit as described with respect to the last described modification. Likewise, the signals resulting from $\lambda_{2w}$ and $\lambda_3$ would be isolated, amplified, rectified, and applied to a ratio circuit also as described with respect to the last described modification.

It is also within the scope of this invention to provide means for deriving three separate radiant energy beams from a single radiant energy source by separating the beams in time instead of in space. A rotary filter device having three or more filters corresponding to the wave lengths $\lambda_1$, $\lambda_2$ and $\lambda_3$, or $\lambda_1$, $\lambda_{2m}$, $\lambda_{2w}$ and $\lambda_3$ of the radiant energy beams desired is an example of one means known in the art for separating beams from a single source along a time base. When the radiant energy beams are separated along a time base a single detector 12 may be used which is gated in sequence to receive each beam separately in sequential time intervals. One means for producing plural radiant energy beams which are separated in time from a single source is illustrated in FIG. 1 of U.S. Patent No. 3,089,382, issued May 14, 1963 to George J. Hecht and Vigo N. Smith, and assigned to Shell Oil Company.

It is also within the scope of this invention to provide means for taking the ratio of $V_m$ to $V_w$ to obtain a voltage signal proportional to the percent moisture in the web. This means may be a third ratio circuit 40 similar to ratio circuits 27 and 28 which receives input voltages $V_m$ and $V_w$, and which produces an output voltage $V_m/V_w$ which is fed into a percent moisture indicator or recorder 41 (see FIGS. 1 and 3). Instead of providing a separate ratio circuit and meter to indicate the voltage ratio $V_m/V_w$ a suitable ratio meter or recorder, known in the art, may be used.

While the invention has been described relating particularly to the continuous measurement of the basis weight of a traveling paper web and concurrent measurement of the quantity of moisture in the paper web, it is not intended that the invention be limited to such specific use. It is contemplated that the base material may be any organic sheet material, both natural and synthetic, such as paper, textiles, thin rubber, tobacco, plastics and other organic materials through which radiant energy beams within the infra-red spectral band may be transmitted. Further, the substance sorbed in the base material may be other than moisture. When the base material is other than paper and the sorbed material is other than moisture, $\lambda_1$ is selected to be a wave length that is subject to molecular bond absorption of the sorbed substance but is not subject to molecular bond absorption of the base material molecule; $\lambda_2$ is selected to be of a wave length which is not subject to molecular bond absorption of the base material and the sorbed material; and $\lambda_3$ is selected to be of a wave length such that it is subject to molecular bond absorption of the base material but is not subject to molecular bond absorption of the sorbed material.

The term "sorbed material" used herein is intended to include any material other than the base material which is absorbed or adsorbed on the base material.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

I claim:

1. An apparatus for measuring the basis weight and moisture content of a paper web comprising a source of radiant energy emitting radiant energy consisting of at least the infrared spectral band, optical means for deriving at least three separate beams of substantial monochromatic radiation within the infra-red spectral band from the radiant energy source and directing each beam through a paper web, each beam being of a specific wave length such that a first beam $\lambda_1$ is of a wave length that is subject to molecular bond absorption by the water molecules within the paper web but is independent of molecular bond absorption by the cellulose molecules in the paper web, a second beam $\lambda_2$ is of a wave length that is independent of a molecular bond adsorption by the cellulose molecules and the water molecules, and a third beam $\lambda_3$ is of a wave length that is subject to molecular bond absorption by the cellulose molecules but is independent of molecular bond absorption by the water molecules, detector means located on the opposite side of said paper web from said radiant energy source for intercepting the radiant energy of each of the beams $\lambda_1$, $\lambda_2$, and $\lambda_3$, which are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_2$, said voltage $V_m$ being proportional to the moisture present in the web, a second ratio calculating means for producing a voltage signal $V_w$ proportional to the ratio of the signal produced from $\lambda_3$ to the signal produced from $\lambda_2$, said voltage $V_w$ being proportional to the cellulose content of the paper web and thus to the basis weight, and separate means for indicating moisture content and basis weight in response to $V_m$ and $V_w$ respectively.

2. The apparatus set forth in claim 1 wherein said detector means includes three separate photoelectric devices.

3. An apparatus for measuring the basis weight and moisture content of a paper web comprising a source of radiant energy emitting radiant energy consisting of at least the infra-red spectral band, optical means for deriving at least three separate beams of substantial monochromatic radiation within the infra-red spectral band from the radiant energy source and directing each beam through a paper web, each beam being of a specific wave length such that a first beam $\lambda_1$ is of a wave length that is subject to molecular bond absorption by the water molecules within the paper web but is independent of molecular bond absorption by the cellulose molecules in the paper web, a second beam $\lambda_2$ is of a wave length that is independent of a molecular bond absorption by the cellulose molecules and the water molecules, and a third beam $\lambda_3$ is of a wave length that is subject to molecular bond absorption by the cellulose molecules but is independent of molecular bond absorption by the water molecules, detector means located on the opposite side of said paper web from said radiant energy source for intercepting the radiant energy of each of the beams $\lambda_1$, $\lambda_2$, and $\lambda_3$, which are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_2$, said voltage $V_m$ being proportional to the moisture present in the web, a second ratio calculating means for producing a voltage signal $V_w$ proportional to the ratio of the signal produced from $\lambda_3$ to the signal produced from $\lambda_2$, said voltage $V_w$ being proportional to the cellulose content of the paper web and thus to the basis weight, separate means for indicating moisture content and basis weight in response to $V_m$ and $V_w$ respectively, and means in the optical paths of beams $\lambda_1$, $\lambda_2$, and $\lambda_3$, respectively to intercept said beams periodically at distinct frequencies $f_1$, $f_2$, and $f_3$, respectively, amplifier means tuned to frequencies $f_1$, $f_2$, and $f_3$, connected to said detector means to isolate and amplify the voltage signals from said detector produced in response to beams $\lambda_1$, $\lambda_2$, and $\lambda_3$, respectively, and separate means for rectifying each of the voltage signals from said amplifiers and feeding the rectified voltage signals derived in response to $\lambda_1$ and $\lambda_2$ to the first ratio calculating means, and feeding the rectified voltage signals derived in response to $\lambda_2$ and $\lambda_3$ to said second ratio calculating means.

4. An apparatus for measuring the basis weight and moisture content of a paper web comprising a source of radiant energy emitting radiant energy consisting of at least the infra-red spectral band, optical means for deriving at least three separate beams of substantial monochromatic radiation within the infra-red spectral band from the radiant energy source and directing each beam through a paper web, each beam being of a specific wave length such that a first beam $\lambda_1$ is of a wave length that is subject to molecular bond absorption by the water molecules within the paper web but is independent of molecular bond absorption by the cellulose molecules in the paper web, a second beam $\lambda_2$ is of a wave length that is independent of a molecular bond absorption by the cellulose molecules and the water molecules, and a third beam $\lambda_3$ is of a wave length that is subject to molecular bond absorption by the cellulose molecules but is independent of molecular bond absorption by the water molecules, detector means located on the opposite side of said paper web from said radiant energy source for intercepting the radiant energy of each of the beams $\lambda_1$, $\lambda_2$, and $\lambda_3$, which are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_2$, said voltage $V_m$ being proportional to the moisture present in the web, a second ratio calculating means for producing a voltage signal $V_w$ proportional to the ratio of the signal produced from $\lambda_3$ to the signal produced from $\lambda_2$, said voltage $V_w$ being proportional to the cellulose content of the paper web and thus to the basis weight, separate means for indicating moisture content and basis weight in response to $V_m$ and $V_w$ respectively said detector means including three separate photoelectric devices, and means in the optical path of said radiant energy source to interrupt said beams at a predetermined frequency $f$, three separate amplifier means tuned to the frequency $f$ each being connected to a different one of said photoelectric devices for isolating and amplifying the voltage signals produced in said photoelectric devices in response to $\lambda_1$, $\lambda_2$, and $\lambda_3$, respectively, and separate means for rectifying each of the voltage signals from said amplifier and feeding the rectified voltage signals derived in response to $\lambda_1$ and $\lambda_2$ to the first ratio calculating means, and for feeding the rectified voltage signals derived in response to $\lambda_2$ and $\lambda_3$ to said second ratio calculating means.

5. The apparatus set forth in claim 1 wherein said optical means for deriving said separate beams of substantially monochromatic radiation separates said beams along a time base, and said detector means is gated to detect said separate beams separately in sequential time intervals.

6. The apparatus set forth in claim 1 wherein said optical means for deriving said separate beams of substantially monochromatic radiation separates said beams in space.

7. The apparatus set forth in claim 1 together with means for producing a voltage signal proportional to the ratio $V_m/V_w$ and means for indicating percent moisture responsive to the voltage signal $V_m/V_w$.

8. An apparatus for measuring the basis weight and moisture content of a paper web comprising a source of radiant energy emitting radiant energy consisting of at least the infra-red spectral band, optical means for deriving multiple separate beams of substantial monochromatic radiation within the infra-red spectral band from the radiant energy source and directing each beam through a paper web, said beam being of a specific wave length such that a first beam $\lambda_1$ is of a wave length that is subject to molecular bond absorption by the water molecules within the paper web but is independent of molecular bond absorption by the cellulose molecules in the paper web, second and third beams $\lambda_{2m}$ and $\lambda_{2w}$ respectively are of a wave length that is independent of a molecular bond absorption by the cellulose molecules and the water molecules, and a fourth beam $\lambda_3$ is of a wave length that is subject to molecular bond absorption by the cellulose molecules but is independent of molecular bond absorption by the water molecules, detector means located on the opposite side of said paper web from said radiant energy source for intercepting the radiant energy of each of the beams $\lambda_1$, $\lambda_{2m}$ and $\lambda_{2w}$, and $\lambda_3$, which are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_{2m}$, said voltage $V_m$ being proportional to the moisture present in the web, a second ratio calculating means for producing a voltage signal $V_w$ proportional to the ratio of the signal produced from $\lambda_3$ to the signal produced from $\lambda_{2w}$, said voltage $V_w$ being proportional to the cellulose content of the paper web and thus to the basis weight, and separate means for indicating moisture content and basis weight in response to $V_m$ and $V_w$ respectively.

9. An apparatus for measuring the basis weight and moisture content of a paper web comprising means for producing and directing through a paper web three separate beams of substantially monochromatic radiation within the infra-red spectral band, each beam being of a specific wave length such that a first beam $\lambda_1$ is of a wave length that is subject to molecular bond absorption by the water molecules within the paper web but is independent of molecular bond absorption by the cellulose molecules in the paper web, a second beam $\lambda_2$ is of a wave length that is independent of molecular bond absorption by the cellulose molecules and the water molecules, and a third beam $\lambda_3$ is of a wave length that is subject to molecular bond absorption by the cellulose molecules but is independent of molecular bond absorption by the water molecules, detector means for intercepting each of the beams $\lambda_1$, $\lambda_2$, and $\lambda_3$ after they are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_2$, said voltage $V_m$ being proportional to the moisture present in the web, a second ratio calculating means for producing a voltage signal $V_w$ proportional to the ratio of the signal produced from $\lambda_3$ to the signal produced from $\lambda_2$, said voltage $V_w$ being proportional to the cellulose content of the paper web and thus to the basis weight of said paper web, and separate means for indicating moisture content and basis weight in response to $V_m$ and $V_w$ respectively.

10. An apparatus for measuring the weight per unit area of a base organic sheet material and the amount of a substance that is sorbed by said base material comprising means for producing and directing through a base sheet material at least three separate beams of substantially monochromatic radiation within the infra-red spectral band, each beam being of a specific wave length such that a first beam $\lambda_1$ is of a wave length that is subject to molecular bond absorption by the sorbed substance molecules within the base material but is independent of molecular bond absorption by the base material, a second beam $\lambda_2$ is of a wave length that is independent of molecular bond absorption by the base material molecules and the sorbed substance molecules, and a third beam $\lambda_3$ is of a wave length that is subject to molecular bond absorption by the base material molecules but is independent of molecular bond absorption by the sorbed substance molecules, detector means for intercepting each of the beams $\lambda_1$, $\lambda_2$, and $\lambda_3$ after they are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_2$, said voltage $V_m$ being proportional to the sorbed substance in the base material, a second ratio calculating means for producing a voltage signal $V_w$ proportional to the ratio of the signal produced from $\lambda_3$ to the signal produced from $\lambda_2$, said voltage $V_w$ being proportional to the weight per unit area of the base material, and separate means for indicating sorbed material content and weight per unit area of base material in response to $V_m$ and $V_w$ respectively.

11. The apparatus set forth in claim 10 wherein said detector means includes three separate photoelectric devices.

12. An apparatus for measuring the weight per unit area of a base organic sheet material and the amount of a substance that is sorbed by said base material comprising means for producing and directing through a base sheet material at least three separate beams of substantially monochromatic radiation within the infra-red spectral band, each beam being of a specific wave length such that a first beam $\lambda_1$ is of a wave length that is subject to molecular bond absorption by the sorbed substance molecules within the base material but is independent of molecular bond absorption by the base material, a second beam $\lambda_2$ is of a wave length that is independent of molecular bond absorption by the base material molecules and the sorbed substance molecules, and a third beam $\lambda_3$ is of a wave length that is subject to molecular bond absorption by the base material molecules but is independent of molecular bond absorption by the sorbed substance molecules, detector means for intercepting each of the beams $\lambda_1$, $\lambda_2$, and $\lambda_3$ after they are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$, to the signal produced from $\lambda_2$, said voltage $V_m$ being proportional to the sorbed substance in the base material, a second ratio calculating means for producing a voltage signal $V_w$ proportional to the ratio of the signal produced from $\lambda_3$ to the signal produced from $\lambda_2$, said voltage $V_w$ being proportional to the weight per unit area of the base material, separate means for indicating sorbed material content and weight per unit area of base material in response to $V_m$ and $V_w$ respectively, and means in the optical paths of beams $\lambda_1$, $\lambda_2$, and $\lambda_3$, respectively to intercept said beams periodically at distinct frequencies $f_1$, $f_2$, and $f_3$, respectively, amplifier means tuned to frequencies $f_1$, $f_2$, and $f_3$, connected to said detector means to isolate and amplify the voltage signals from said detector produced in response to beams $\lambda_1$, $\lambda_2$, and $\lambda_3$, respectively, and separate means for rectifying each of the voltage signals from said amplifiers and feeding the rectified voltage signals derived in response to $\lambda_1$ and $\lambda_2$ to the first ratio calculating means, and feeding the rectified voltage signals derived in response to $\lambda_2$ and $\lambda_3$ to said second ratio calculating means.

13. An apparatus for measuring the weight per unit area of a base organic sheet material and the amount of a substance that is sorbed by said base material comprising means for producing and directing through a base sheet material at least three separate beams of substantially monochromatic radiation within the infra-red spectral band, each beam being of a specific wave length such that a first beam $\lambda_1$ is of a wave length that is subject to molecular bond absorption by the sorbed substance molecules within the base material but is independent of molecular bond absorption by the base material, a second beam $\lambda_2$ is of a wave length that is independent of molecular bond absorption by the base material molecules and the sorbed substance molecules, and a third beam $\lambda_3$ is of a wave length that is subject to molecular bond absorption by the base material molecules but is independent of molecular bond absorption by the sorbed substance molecules, detector means for intercepting each of the beams $\lambda_1$, $\lambda_2$, and $\lambda_3$ after they are transmitted through said web and for producing separate electrical voltage signals which are proportional to the intensity of the radiant energy of each of said beams intercepted by said detector means, a first ratio calculating means for producing a voltage signal $V_m$ proportional to the ratio of the signal produced from $\lambda_1$ to the signal produced from $\lambda_2$, said voltage $V_m$ being proportional to the sorbed substance in the base material, a second ratio calculating means for producing a voltage signal $V_w$ proportional to the ratio of the signal produced from $\lambda_3$ to the signal produced from $\lambda_2$, said voltage $V_w$ being proportional to the weight per unit area of the base material, separate means for indicating sorbed material content and weight per unit area of base material in response to $V_m$ and $V_w$ respectively said detector means including three separate photoelectric devices, and means in the optical path of said radiant energy source to interrupt said beams at a predetermined frequency $f$, three separate amplifier means tuned to the frequency $f$ each being connected to a different one of said photoelectric devices for isolating and amplifying the voltage signals produced in said photoelectric devices in response to $\lambda_1$, $\lambda_2$, and $\lambda_3$, respectively, and separate means for rectifying each of the voltage signals from said amplifier and feeding the rectified voltage signals derived in response to $\lambda_1$ and $\lambda_2$ to the first ratio calculating means, and for feeding the rectified voltage signals derived in response to $\lambda_2$ and $\lambda_3$ to said second ratio calculating means.

14. The apparatus set forth in claim 10 wherein said means for producing and directing through a base sheet material at least three separate beams, separates said beams along a time base, and said detector means is gated to detect said separate beams separately in sequential time intervals.

15. The apparatus set forth in claim 10 wherein said means for producing and directing through a base sheet material at least three separate beams, separates said beams in space.

16. The apparatus set forth in claim 10 together with means for producing a voltage signal proportional to the ratio $V_m/V_w$ and means for indicating percent moisture responsive to the voltage signal $V_m/V_w$.

References Cited
UNITED STATES PATENTS

| | | | |
|---|---|---|---|
| 3,122,227 | 2/1964 | Bookout et al. | 88—14 |
| 3,228,282 | 1/1966 | Barker | 250—83.3 X |

RALPH G. NILSON, *Primary Examiner.*

S. ELBAUM, *Assistant Examiner.*